United States Patent
Cheong et al.

(10) Patent No.: US 11,304,186 B2
(45) Date of Patent: **\*Apr. 12, 2022**

(54) CHANNEL SOUNDING METHOD IN WIRELESS LAN SYSTEM AND DEVICE FOR SUPPORTING SAME

(71) Applicant: ELECTRONICS AND TELECOMMUNICATIONS RESEARCH INSTITUTE, Daejeon (KR)

(72) Inventors: Min ho Cheong, Seoul (KR); Hyoung Jin Kwon, Daejeon (KR); Jae Seung Lee, Daejeon (KR); Sok Kyu Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/455,385

(22) Filed: Jun. 27, 2019

(65) Prior Publication Data

US 2019/0349903 A1 Nov. 14, 2019

Related U.S. Application Data

(63) Continuation of application No. 14/890,303, filed as application No. PCT/KR2014/004214 on May 12, 2014, now Pat. No. 10,375,682.

(30) Foreign Application Priority Data

| May 10, 2013 | (KR) | 10-2013-0053442 |
| May 16, 2013 | (KR) | 10-2013-0055733 |
| May 12, 2014 | (KR) | 10-2014-0056368 |

(51) Int. Cl.
*H04W 72/04* (2009.01)
*H04W 48/12* (2009.01)
(Continued)

(52) U.S. Cl.
CPC ........ *H04W 72/042* (2013.01); *H04B 17/309* (2015.01); *H04W 48/12* (2013.01);
(Continued)

(58) Field of Classification Search
None
See application file for complete search history.

(56) References Cited

U.S. PATENT DOCUMENTS

| 2012/0026909 | A1 | 2/2012 | Seok | |
| 2013/0128798 | A1* | 5/2013 | Liu | H04W 74/0875 370/312 |

(Continued)

FOREIGN PATENT DOCUMENTS

| CN | 101056135 A | 10/2007 |
| CN | 101983485 A | 3/2011 |

(Continued)

OTHER PUBLICATIONS

Minyoung Park et al., "Frequency Selective Transmission", doc.: IEEE 11-12/1338r0, Nov. 12, 2012, pp. 1-14.
(Continued)

*Primary Examiner* — Hong Shao

(57) ABSTRACT

A method for channel sounding in a wireless local area network (WLAN) system and apparatus for the same is disclosed. An access point (AP) to perform the method for channel sounding broadcasts information on a restricted access window (RAW) for channel sounding included in a beacon, and transmits null data packets (NDP) for channel estimation in the RAW to a station (STA). The STA esti-
(Continued)

mates channel information based on the NDPs, and transmits the estimated channel information to the AP.

13 Claims, 14 Drawing Sheets

(51) Int. Cl.
  *H04B 17/309* (2015.01)
  *H04W 74/00* (2009.01)
  *H04W 84/12* (2009.01)
(52) U.S. Cl.
  CPC ...... *H04W 72/0413* (2013.01); *H04W 74/006* (2013.01); *H04W 84/12* (2013.01)

(56) References Cited

U.S. PATENT DOCUMENTS

| | | | | |
|---|---|---|---|---|
| 2013/0195036 A1* | 8/2013 | Quan | .................. | H04W 72/085 370/329 |
| 2014/0086200 A1* | 3/2014 | Seok | ....................... | H04L 5/003 370/330 |
| 2014/0098724 A1* | 4/2014 | Park | .................. | H04W 52/0235 370/311 |
| 2015/0085777 A1* | 3/2015 | Seok | ................. | H04W 52/0219 370/329 |

FOREIGN PATENT DOCUMENTS

| | | |
|---|---|---|
| KR | 10-20100138692 A | 12/2010 |
| KR | 101099345 B | 12/2011 |
| KR | 10-20130039669 A | 4/2013 |
| KR | 10-20130042582 A | 4/2013 |
| WO | WO2008019924 A1 | 2/2008 |
| WO | WO2012093794 A2 | 7/2012 |
| WO | WO2013022254 A2 | 2/2013 |

OTHER PUBLICATIONS

Minho Cheong et al., "Sector Discovery for 11 ah", IEEE 802.11-13/0306rO, Mar. 18, 2013, pp. 1-19.
Minyoung Park, "Specification Framework for TGah D13.x", IEEE 802.11-13/0354rO, Mar. 20, 2013, pp. 1-65.

* cited by examiner

CHANNEL SOUNDING METHOD IN WIRELESS LAN SYSTEM AND DEVICE FOR SUPPORTING SAME

CROSS-REFERENCE TO RELATED APPLICATION

This application is a continuation of application Ser. No. 14/890,303, filed on Nov. 10, 2015 in the U.S. Patent and Trademark Office, which is a national stage application, filed under 35 U.S.C. § 371, of International Patent Application No. PCT/KR2014/004214, filed on May 12, 2014 and claims priority to and the benefit of Korean Patent Application No. 10-2014-0056368, filed on May 12, 2014, Korean Patent Application No. 10-2013-0055733, filed on May 16, 2013, and Korean Patent Application No. 10-2013-0053442, filed on May 10, 2013 in the Korean Intellectual Property Office, the entire contents of which are incorporated herein by reference.

TECHNICAL FIELD

The present invention relates to a wireless local area network (WLAN) system, and more particularly, to a method for channel sounding in a WLAN system.

BACKGROUND ART

A local area network (LAN) is largely classified into a wired LAN and a wireless LAN (WLAN). The WLAN is a communication method performed in a network using an electric wave rather than a cable. With an advent of the WLAN, anticipation is growing for the WLAN to resolve cabling-related issues, such as installation, maintenance, or movement of cables. Moreover, as a number of mobile users are increasing, a demand for the WLAN is also set to surge.

A configuration of the WLAN includes an access point (AP) and a station (STA). The AP refers to equipment for transmitting an electric wave to enable WLAN users within a transmission distance to connect to the Internet and use a network. The AP functions as a base station (BS) of a mobile phone or a hub of a wired network.

A basic building block of an Institute of Electrical and Electronics Engineers (IEEE) 802.11 network is referred to as a basic service set (BSS). The IEEE 802.11 network includes an independent BSS in which STAs in a BSS perform direct communication with one another, an infrastructure BSS in which an AP is used during a process in which an STA performs communication with STAs internal or external to a BSS, and an extended service set (ESS) in which BSSs are connected to one another to expand a service area.

In a next generation WLAN system, an AP simultaneously transmits a data frame to at least one STA in a multiple input multiple output (MIMO) pairing.

In the WLAN system, when an AP and/or STA transmits a frame to a target receiver AP and/or STA, information on a channel to be used may be obtained through channel sounding. A process in which a transmitter requests, from a receiver, channel information to be used for frame transception, and the receiver estimates a channel and sends a feedback on the channel information to the transmitter is performed prior to the frame transception.

DISCLOSURE OF INVENTION

Technical Solutions

According to an aspect of the present invention, there is provided a method for channel sounding in a wireless local area network (WLAN) system performed by an access point (AP), the method including broadcasting a beacon including information on a restricted access window (RAW) for channel sounding, and transmitting a plurality of null data packets (NDP) in the RAW to a station (STA).

The AP may control data transmission by the STA over a duration of the RAW for the channel sounding.

The AP may control the data transmission by the STA to be prohibited over the RAW duration for the channel sounding.

The AP may control transmission of the channel information to the AP to be allowed, and other transmissions to be prohibited, subsequent to the transmission of the NDPs in the RAW duration for the channel sounding.

The beacon may include at least one of a bit value indicating whether the channel sounding is performed through the RAW, a bit value to control the transmission by the STA in the RAW duration, and a bit value indicating a communication type to be performed by the AP.

The method channel sounding may further include receiving, from the STA, channel information estimated based on the NDPs.

According to an aspect of the present invention, there is provided a method for channel sounding in a WLAN system performed by an STA, the method including receiving, from an AP, a beacon including information on an RAW for channel sounding, estimating channel information based on an NDP received from the AP, and transmitting the estimated channel information to the AP.

The estimating may include identifying a communication type to be performed by the AP based on the received beacon, receiving the NDP from the AP in the RAW when the STA supports the communication type, and estimating channel information based on the received NDP and the identified communication type.

The estimating may include searching for a frequency channel that satisfies a predetermined reference from among frequency channels used in communication with the AP, and determining information on the found frequency channel to be channel information.

The estimating may include searching for a sector to which the STA belongs from among a plurality of sectors set by the AP, and determining identification information on the found sector to be channel information.

According to an aspect of the present invention, there is provided a wireless apparatus including a transceiver to transmit and receive a frame, and a processor functionally associated with the transceiver, wherein the processor broadcasts a beacon including information on an RAW for channel sounding, and transmits a plurality of NDPs in the RAW to an STA.

According to an aspect of the present invention, there is provided a wireless apparatus including a transceiver to transmit and receive a frame, and a processor functionally associated with the transceiver, wherein the processor receives, from an AP, a beacon including information on an RAW for channel sounding, estimates channel information based on an NDP received from the AP, and transmits the estimated channel information to the AP.

BEST MODE FOR CARRYING OUT THE INVENTION

Figure 1:
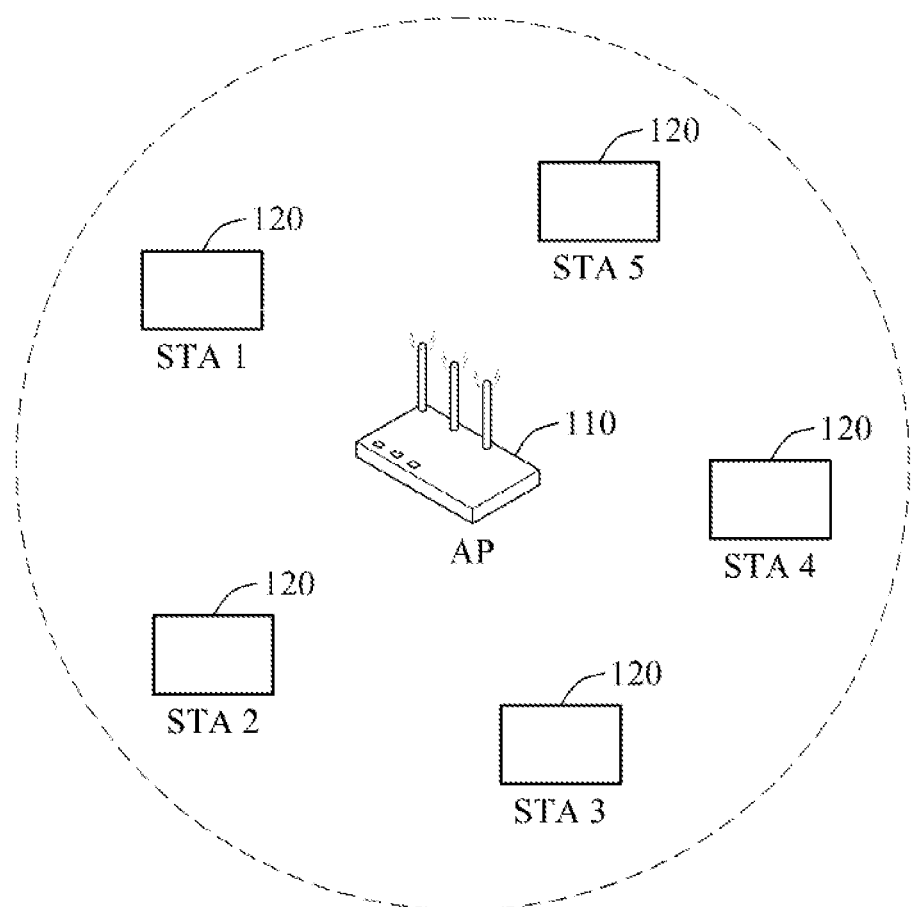
FIG. 1 is a diagram illustrating a configuration of a wireless local area network (WLAN) system.

Hereinafter, reference will now be made in detail to embodiments of the present invention, examples of which are illustrated in the accompanying drawings. The embodiments are described below in order to explain the present invention by referring to the drawings. While this invention has been particularly shown and described with reference to preferred embodiments thereof, it will be understood by those skilled in the art that various changes in form and details may be made therein without departing from the spirit and scope of the invention as defined by the appended claims. The preferred embodiments should be considered in descriptive sense only and not for purposes of limitation. Therefore, the scope of the invention is defined not by the detailed description of the invention but by the appended claims, and all differences within the scope will be construed as being included in the present invention.

The following embodiments are combined in the form prescribed by the components and features of the present invention. The elements or features should be considered optional unless otherwise mentioned. The embodiments may be carried out for each component or feature not being combined with other elements or features. In addition, it is also possible to configure embodiments herein by combining some of the components and/or features. The order of operations described in the embodiments of the present disclosure can be changed. Some features or configurations of one embodiment may be included in another embodiment, or may be replaced with the corresponding features or configurations of another embodiment.

These specific terms are provided to assist understanding of the specific terminology used in the following description of the present invention, and can be changed to another form without departing from the scope the technical idea of the present invention.

In some cases, the known structures and devices are omitted to avoid obscuring the concepts of the present invention, or illustrated in a form of a block diagram of the center of the core functionality of the structures and devices.

The embodiments of the present invention can be supported by at least one disclosed in the standard documents of such wireless access systems, for example, an Institute of Electrical and Electronics Engineers (IEEE) 802 system, a 3 good publication practice (GPP) system, 3GPP long-term evolution (LTE) and LTE-advanced (LTE-A) systems, and a 3GPP2 system. In other words, those steps or parts not described to clearly reveal the technical idea of the present invention may be supported by the standard documents. All terms disclosed in this specification can be explained by the standard documents.

Technologies herein can be used for a variety of wireless access systems, such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented in a radio technology such as universal terrestrial radio access (UTRA) or CDMA2000. TDMA can be implemented in a radio technology such as global system for mobile communications (GSM)/general packet radio service (GPRS)/enhanced data rates for GSM evolution (EDGE). OFDMA can be implemented in a radio technology such as IEEE 802.11 (wireless fidelity (Wi-Fi)), IEEE 802.16 (worldwide interoperability for microwave access (WiMAX)), IEEE 802-20, and evolved-UTRA (E-UTRA). Hereinafter, an example of the IEEE 802.11 system will be described for clarity, though not limiting the scope the technical idea of the present invention thereto.

FIG. 1 is a diagram illustrating a configuration of a wireless local area network (WLAN) system.

The WLAN system includes at least one basic service set (BSS). As used herein, the BSS may refer to a group of stations (STA) successfully synchronized to communicate with one another, though not confined to a specific area.

An infrastructure BSS includes at least one non-access point (AP) STA, an AP 110 to provide a distribution service, and a distribution system to connect the AP 110 provided in multiple. In the infrastructure BSS, the AP 110 manages the non-AP STA of the BSS.

As used herein, the STA may refer to a predetermined function medium including an IEEE 802.11-conformant medium access control (MAC) and physical layer (PHY) interface to the wireless medium (WM) defined by IEEE 802.11. An example of the STA in a broad sense may include an AP and a non-AP STA.

As used herein, the non-AP STA may refer to an STA not corresponding to an AP, hereinafter also referred to as a mobile terminal, a wireless device, a wireless transmit/receive unit (WTRU), user equipment (UE), a mobile station (MS), a mobile subscriber unit, or a user. Hereinafter, the non-AP STA is referred to as the STAs 120 for ease of description.

The AP 110 is a function object to provide connection with respect to a distribution system via a WM for the STAs 120 associated with a corresponding AP 110. In general, communication amongst the STAs 120 is performed via the AP 110 in the infrastructure BSS including the AP 110. However, when a direct link is set amongst the STAs 120, at least one corresponding STA 120 may communicate with one another directly, not via the AP 110. For example, the AP 110 may be also referred to as a central controller, a base station (BS), a node-B, or a base transceiver system (BTS).

A plurality of infrastructure BSSs including the BSS illustrated in FIG. 1 is interconnected through the distribution system. The plurality of infrastructure BSSs interconnected through the distribution system is referred to as an extended service set (ESS). The AP 110 and the STA 120 included in the ESS communicate with one another, and the STA 120 moves to another BSS within the same ESS.

In the WLAN system pursuant to IEEE 802.11, a basic connection mechanism of MAC is a carrier sense multiple access with collision avoidance (CSMA/CA) mechanism. The CSMA/CA mechanism is also referred to as a distributed coordination function (DCF) of IEEE 802.11 MAC, and basically adopts a "listen before talk" mechanism. For example, the AP 110 and/or the STA 120 sense a wireless channel or a medium prior to transmitting a frame. When the medium is determined to be in an idle status based on a result of the sensing, the AP 110 and/or the STA 120 commence transmitting the frame. Conversely, when the medium is detected to be in an occupied status, the AP 110 and/or the STA 120 do not commence transmission, and wait by setting a delay period for medium access.

The CSMA/CA mechanism includes physical carrier sensing in which the AP 110 and/or the STA 120 directly sense a medium, and virtual carrier sensing. The virtual carrier sensing is conducted to remedy issues, for example, a hidden node problem, likely to occur in medium access. MAC of the WLAN system uses a network allocation vector (NAV) for the virtual carrier sensing. The NAV is a value indicated, by the AP 110 and/or the STA 120 currently using or allowed to use a medium, of a period of time remaining until the medium is available, to other AP 110 and/or the STA 120. Accordingly, a value set as the NAV is related to a period of time during which the medium is to be used by the AP 110 and/or the STA 120 that transmit a corresponding frame.

In the WLAN system of FIG. 1, the AP 110 transmits data to an STA group including at least one STA from among the at least one STA 120 associated with the AP 110.

In a multi user-multiple input multiple output (MU-MIMO) communication system, the AP 110 transmits a plurality of space streams to the at least one STA 120 using multiple antennas. When the AP 110 uses a plurality of transmission antennas, the AP 110 transmits data to the STA 120 based on a beamforming technology to enhance a transmission performance.

The AP 110 requires channel information with respect to the STA 120 to transmit the data, and performs channel sounding to obtain the required channel information. The channel sounding is performed based on a null data packet (NDP) and an NDP announcement (NDPA). The NDP includes a physical layer convergence protocol (PLCP) protocol data unit (PPDU) format from which a data field in an MAC layer is excluded. The AP 110 employs the NDP to extract the channel information from the STA 12. The STA 120 performs channel estimation based on a received NDP, and sends a feedback on channel status information to the AP 110 based on a result of the estimation. For example, the STA 120 estimates an MIMO channel based on very high throughput-long training fields (VHT-LTF) of the NDP, and obtains channel information. The NDP is also referred to as a sounding frame.

The NDPA is transmitted to indicate an STA to receive the NDP, and also referred to as a sounding announcement frame. The STA 120 determines whether the STA 120 is an STA to participate in channel sounding based on the NDPA. The AP 110 includes, in an NDPA frame, information on the STA targeted for the channel sounding, and transmits the information to the STA 120. The AP 110 instructs the STA 120 to receive the NDP using the NDPA frame. The AP 110 transmits the NDPA and the NDP based on a restricted access window (RAW).

The RAW is a duration of time in which access is permitted to predetermined STAs. The AP 110 prevents degradation of a channel sounding performance caused by an STA arbitrarily transmitting a frame during a channel sounding process by transmitting the NDPA and the NDP based on the RAW. The AP 110 optionally performs the channel sounding with respect to predetermined STAs. Thus, the channel sounding performance is enhanced.

Figure 2:
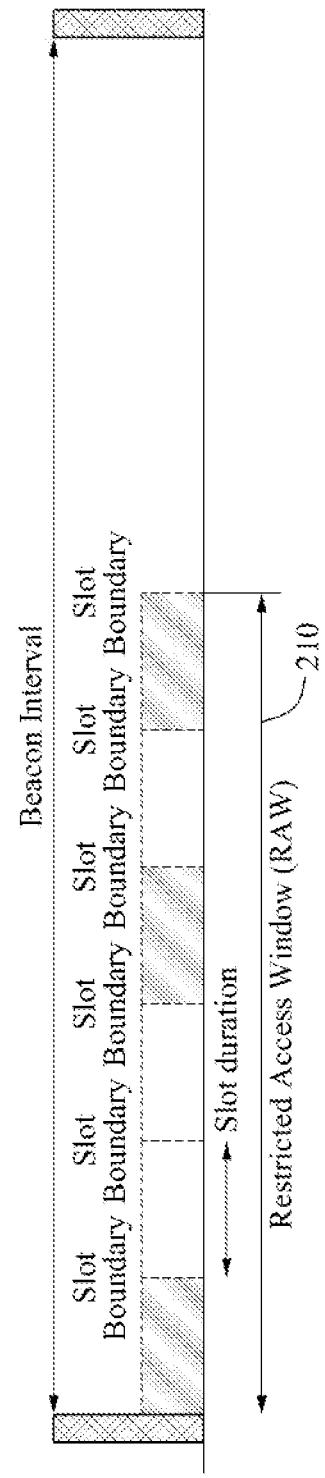
FIGS. 2 and 3 are diagrams illustrating an uplink channel access protocol through allocation for a plurality of durations of wireless communication.
Figure 3:
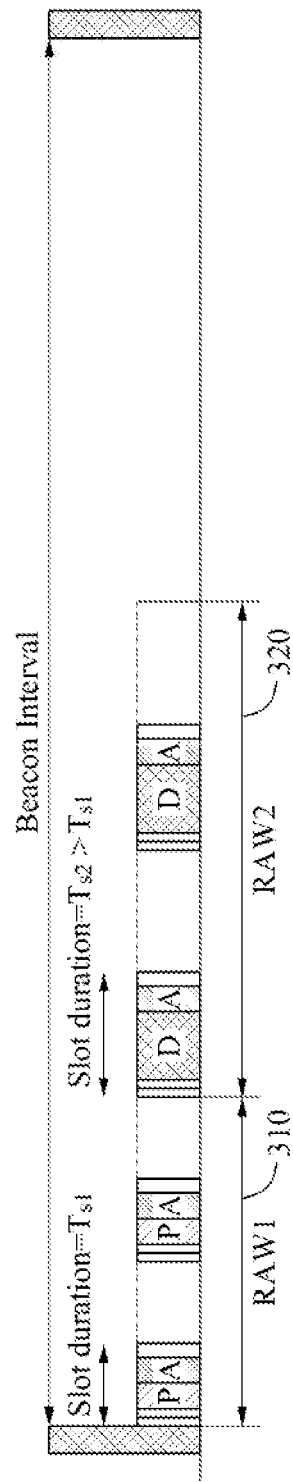

FIGS. 2 and 3 are diagrams illustrating an uplink channel access protocol through allocation for a plurality of durations of wireless communication.

Referring to FIG. 2, an AP controls an access of an STA through an RAW 210. The RAW 210 includes a plurality of time slots. The STA wakes up at a target beacon transmission time (TBTT), and receives a beacon frame. The TBTT is a point in time at which the AP transmits the beacon frame. The beacon frame includes information on a slot duration for each RAW. A length of a slot for each RAW is set differently. The STA determines a channel access slot set by the AP, and remains in a sleep status prior to the corresponding channel access slot. The STA commences channel access based on an enhanced distributed channel access (EDCA) protocol adjacent to a slot boundary of the corresponding channel access slot.

The AP reports the STA of whether a transmit opportunity (TXOP) scheme is applied to each RAW 210. For example, the AP indicates that a TXOP or transmission in the TXOP does not deviate from a slot boundary. When the TXOP scheme is applied, the STA wakes up at the slot boundary, and does not wait for a period of Probe Delay.

Referring to FIG. 3, the AP sets a regulation for RAWs having differing slot lengths. "P" frame denotes a power saving poll (PS-Poll)/Trigger frame, "D" frame denotes a frame used in data transmission, and "A" frame denotes an acknowledgement (ACK) frame as shown in FIG. 3. When the TXOP scheme is applied as the regulation for the RAWs having differing slot lengths, a frame exchange sequence in the RAW may be restricted within a slot duration. The frame exchange sequence includes a start frame and a response frame. As shown in FIG. 3, an RAW1 310 is used as a protection duration for Poll signals, and an RAW2 320 is used as a protection duration for DATA transmission.

Figure 4:
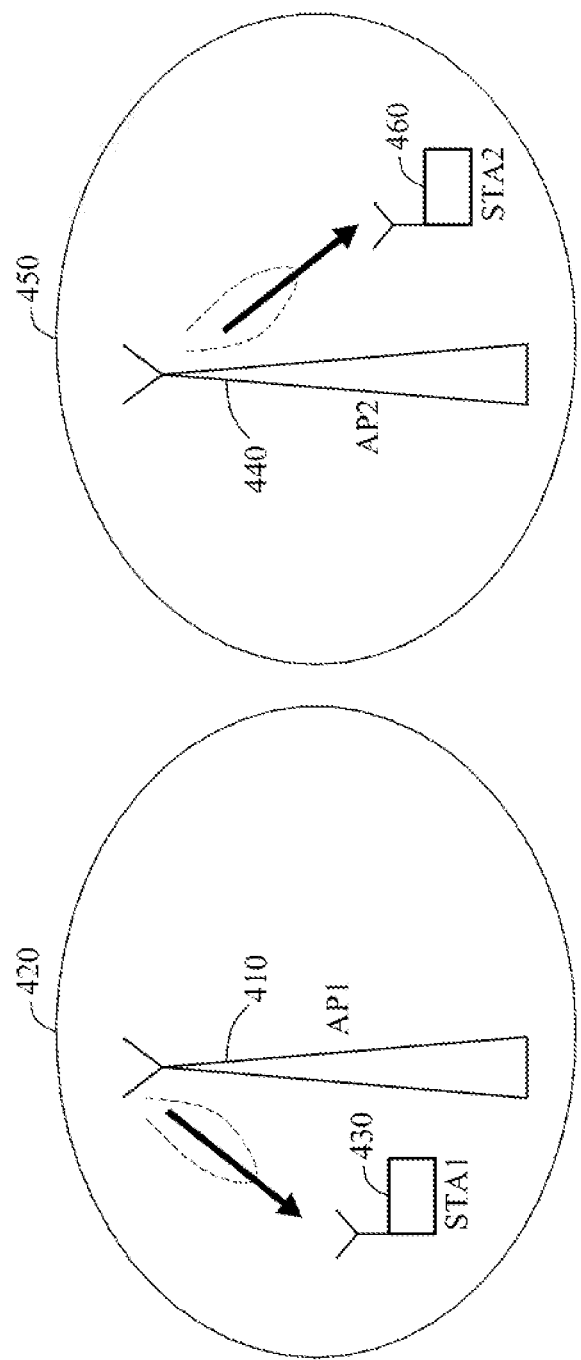
FIGS. 4 through 6 are diagrams illustrating a method for sectorized beam operation.
Figure 5:
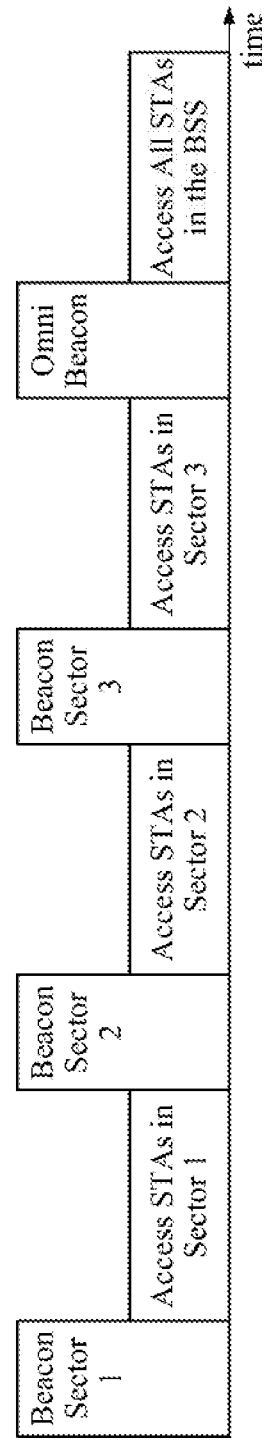
Figure 6:
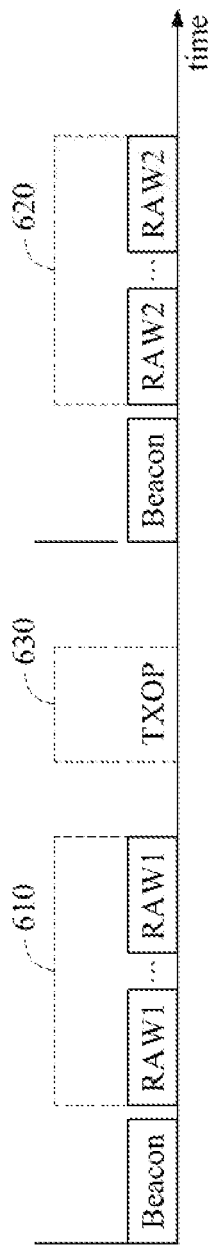

FIGS. 4 through 6 are diagrams illustrating a method for sectorized beam operation.

Referring to FIG. 4, an AP communicates with an STA based on the method for sectorized beam operation. In general, the method for sectorized beam operation is employed to re-use spatial resources in a network installed in a wide area. An AP1 410 transmits data through sectorized beam transmission to an STAT 420. In a similar manner, an AP2 440 transmits data through sectorized beam transmission to an STA2 460. The method for sectorized beam operation efficiently reduces interference from neighboring APs and interference from an overlapped BSS (OBSS). Moreover, a hidden node issue in the same BSS may be mitigated because a number of STAs in an activation status decreases when the method for the sectorized beam operation is used in a predetermined sector.

FIG. 5 illustrates an example of the method for the sectorized beam operation. Referring to FIG. 5, an AP divides a space into a plurality of sectors, and allocates resources to STAs belonging to each of the plurality of sectors based on a time division method. A beacon signal is independently transmitted to each of the plurality of sectors, and each of the STAs included in the sectors transmits or receives data within a duration of time allocated to each of the sectors. A predetermined duration of time is allocated as a common duration of time available to be used by the STAs in all of the sectors.

FIG. 6 illustrates another example of the method for the sectorized beam operation. Referring to FIG. 6, an AP flexibly selects whether to perform sectorized beam transmission or omni-directional beam transmission. Through this, an application of the method for the sectorized beam operation is relatively flexible. The omni-directional beam transmission is performed in RAW durations 610 and 620. The sectorized beam transmission is allowed when a sector in a reserved short duration of time is known to an AP, and available to be performed in the corresponding short duration of time. A sector reception beam is used in association with a sector transmission beam in a TXOP duration 630. The AP indicates information on the sectorized beam transmission through a beacon, a probe response, and an association response. A method of forming a sector beam may vary based on implementation plans.

Figure 7:
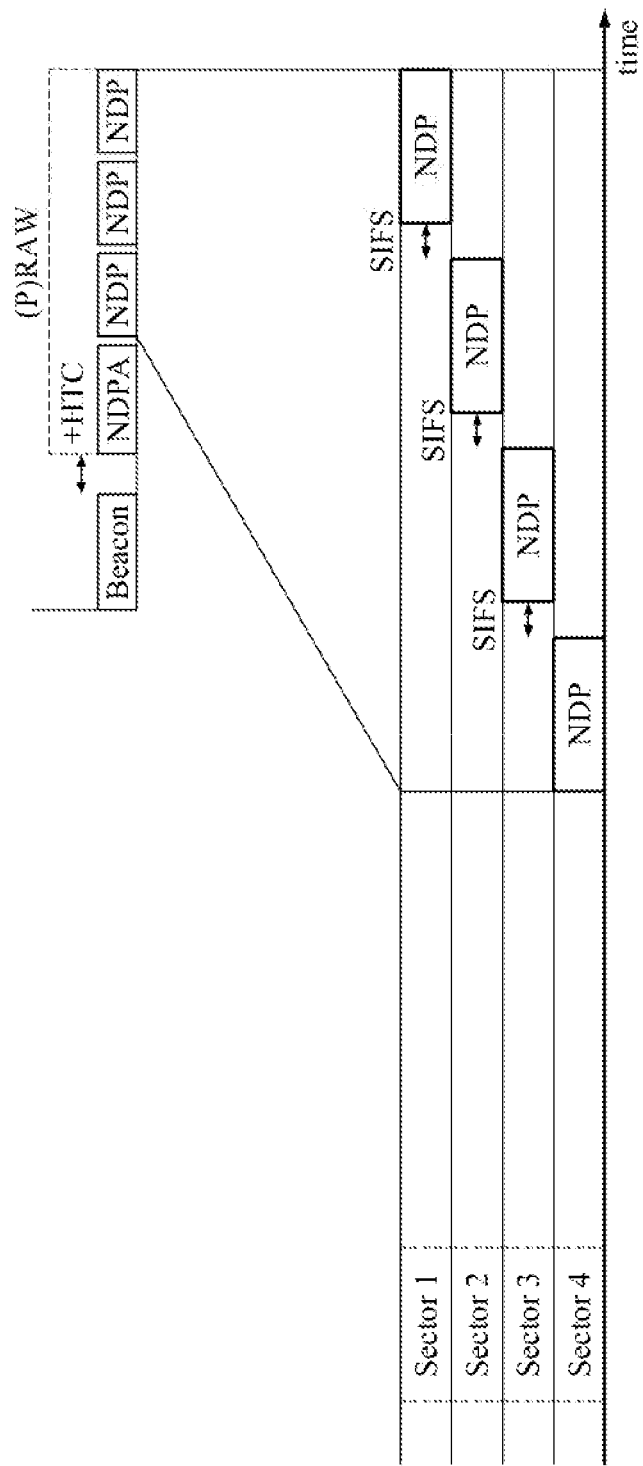
FIG. 7 is a diagram illustrating a method for channel sounding for sectorized beam operation according to an embodiment of the present invention.

FIG. 7 is a diagram illustrating a method for channel sounding for sectorized beam operation according to an embodiment of the present invention.

Referring to FIG. 7, an AP successively transmits a series of NDPs, or NDP frames, over a duration of an RAW for channel sounding, hereinafter also referred to as a "sounding RAW." The transmitted NDPs are transmitted having short inter-frame spaces (SIFS) between each other. Each of the NDPs is transmitted to a corresponding signal for each sector for sector training. FIG. 7 illustrates an example in which a number of sector beams is four, and the AP performs channel sounding based on an RAW or a periodic RAW (PRAW) subsequent to transmitting a beacon signal. A +high throughput control (+HTC) frame is transmitted prior to an NDP.

According to an embodiment of the present invention, transmission performed by an STA is prohibited during a sounding RAW to guarantee a channel sounding performance. However, the STA wakes up at a beginning of the sounding RAW, and listens to an entire sounding RAW. The channel sounding is performed on all STAs or STAs having a restricted range of an association identification (AID). An STA targeted for the channel sounding is prohibited from transmission in a sounding RAW duration.

The AID refers to an identification (ID) assigned to an STA from an AP.

According to another embodiment of the present invention, any transmission performed by an STA aside from transmission of a report packet to report a sector ID subsequent to receiving a series of NDPs is prohibited during a sounding RAW to guarantee the channel sounding performance. The channel sounding is performed on all STAs or STAs having a restricted range of an AID. The STA wakes up at a beginning of the sounding RAW, and listens to an end of the sounding RAW or an end of the transmission of the series of NDPs.

Due to such unique characteristics of an STA operation, sounding RAW indication information indicating whether an RAW is a sounding RAW or a general RAW is needed to be included in a beacon. The sounding RAW indication information is indicated on an RAW parameter set (PRS) information element (IE) transmitted from the beacon.

Figure 8:
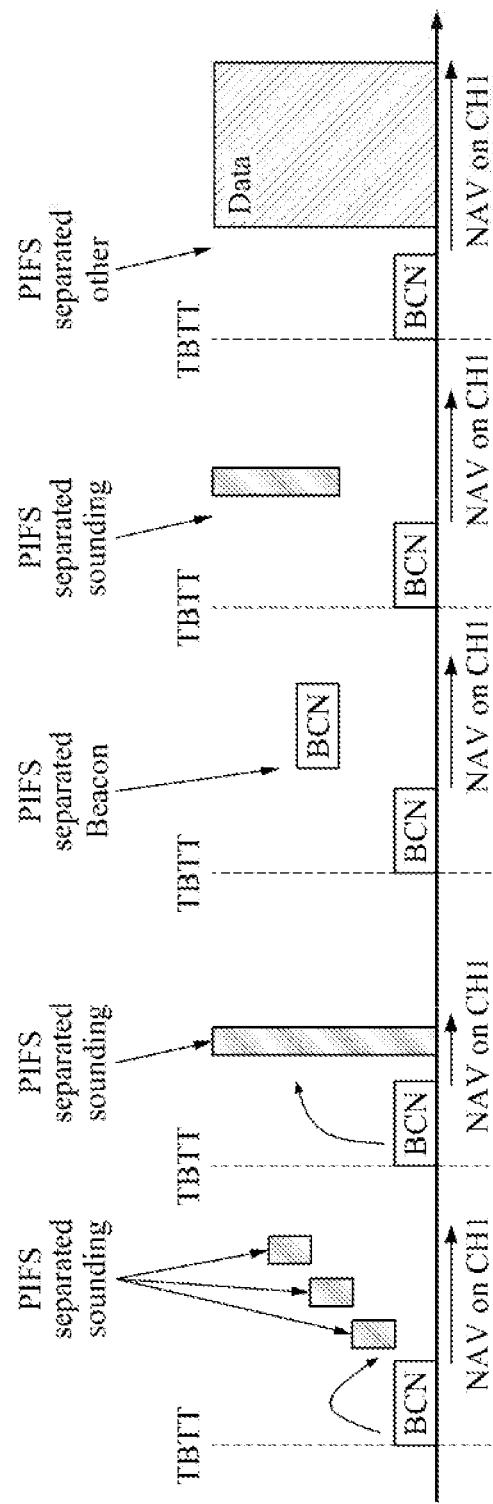
FIG. 8 is a diagram illustrating an example of a method for channel sounding in sub-channel selective transmission (SST).

FIG. 8 is a diagram illustrating an example of a method for channel sounding in sub-channel selective transmission (SST).

An AP communicates with an STA through the SST. In the SST, the STA selects a sub-channel for transmission and reception performed by the STA in a broadband BSS when allowed by the AP. The STA searches for an optimum sub-channel for the communication with the AP, and transmits information on the found optimum sub-channel to the AP. The AP indicates related information through a beacon to enable STAs to measure channel sounding through frames transmitted subsequent to a beacon signal. For example, a beacon includes information on a number of signals, a type of signals, a frequency position of a signal, and a duration of time.

The AP optionally transmits a beacon indicating a sub-channel sounding signal. The AP successively transmits a sounding signal of a single channel or multiple channels. The channel sounding is performed by an NDP signal, an additional beacon signal, or another packet by an AP. Information on a number of sounding signals, a type of sounding signals, for example, an NDP or a beacon, and a frequency position is included in a beacon. An NAV is set with respect to a sounding signal by a beacon. The AP selects a length of time allocated to a channel sounding process. The STA determines channels on which sounding is to be performed during a period of an examining beacon over a plurality of cycles. The STA selects the optimum sub-channel based on a sounding signal. The STA determines whether to switch to additional channels based on beacon information. A beacon signal and a sounding signal are transmitted at time intervals of a point inter-frame space (PIFS).

Figure 9:
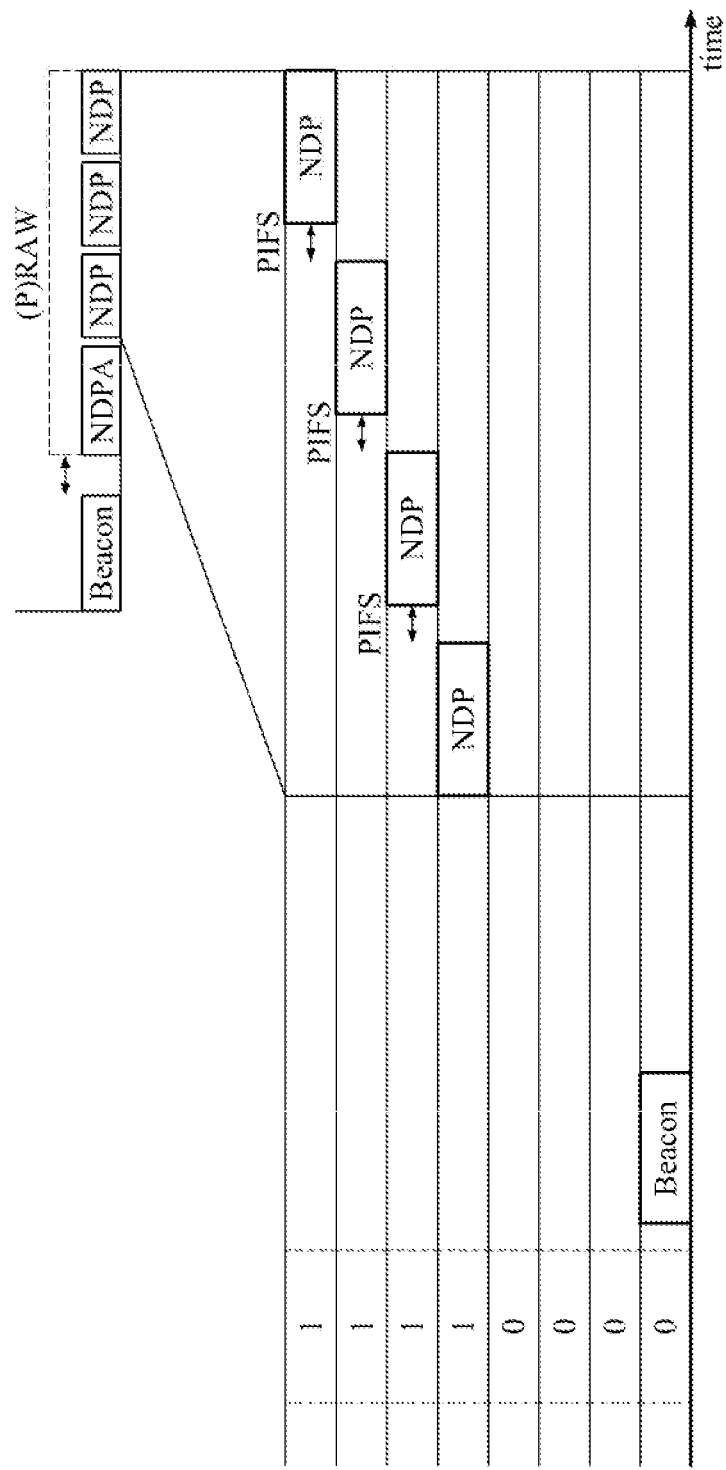
FIG. 9 is a diagram illustrating a method for channel sounding for SST according to an embodiment of the present invention.

FIG. 9 is a diagram illustrating a method for channel sounding for SST according to an embodiment of the present invention.

Referring to FIG. 9, in the method for the channel sounding for SST, an AP successively transmits a series of NDPs. The NDPs are transmitted at time intervals of a PIFS, and each of the NDPs is transmitted with respect to frequency channels allocated to the NDPs, respectively. Here, timing information of channel sounding using an NDP needs to be indicated in an RPS IE of a beacon. FIG. 9 illustrates an example in which a channel activity bitmap is {0, 0, 0, 0, 1, 1, 1, 1}, a maximum transmission width is "2" megahertz (MHz), and a bandwidth span for each NDP is 2 MHz. A bandwidth span of an NDPA may or may not be a duplicate mode.

According to another embodiment of the present invention, the method for the channel sounding for SST is performed in conjunction with a PS-Poll RAW. In an instance of downlink (DL) transmission, an STA to perform SST does not transmit a PS-Poll frame with respect to an STA for which a traffic indication map (TIM) is set to be "1" directly subsequent to receiving a beacon. When a PS-Poll duration pre-scheduled or newly allocated for other purposes exists subsequent to a sounding RAW, the STA waits until the corresponding PS-Poll duration terminates, and reports, to an AP, optimum sub-channel information obtained by a PS-Poll. The STA receives data from the AP through the corresponding optimum sub-channel over an RAW duration for data transmission.

In an instance of uplink (UP) transmission, an STA to perform SST transmits data to an AP through an optimum sub-channel over an RAW duration for data transmission when the AP is informed through a PS-Poll with a user data indication (UDI) of an amount of data to be transmitted over a PS-Poll RAW duration subsequent to a sounding RAW. When a frame to be transmitted to the AP exists, the STA transmits data to the AP through the optimum sub-channel determined through channel sounding over a slot allocated to the RAW duration for the data transmission.

In the SST, a sounding RAW, a PS-Poll RAW, and an RAW for data transmission need to be allocated subsequent to an activation time because the STA transmits data to the AP through a sub-channel subsequent to the activation time defined in a beacon. Accordingly, the PS-Poll RAW in the DL transmission and UL transmission in the SST needs to be allocated subsequent to the sounding RAW. Although the PS-Poll RAW may be allocated prior to the activation time, the PS-Poll RAW allocated prior to the activation time corresponds to a PS-Poll RAW unrelated to an SST operation. Resources may be efficiently allocated by enabling the AP to identify optimum sub-channels for a plurality of STAs in advance while minimizing time resources consumed in the SST by allocating the PS-Poll RAW subsequent to the sounding RAW.

Figure 10:
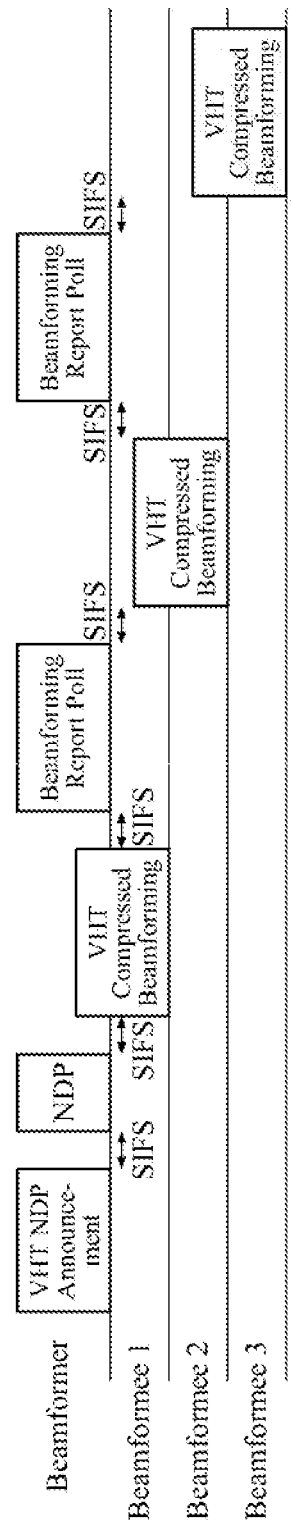
FIG. 10 is a diagram illustrating single user-multiple input multiple output (SU-MIMO) beamforming or multi user-MIMO (MU-MIMO) beamforming.

FIG. 10 is a diagram illustrating single user-MIMO (SU-MIMO) beamforming or MU-MIMO beamforming.

In 802.11 ac, the SU/MU-MIMO beamforming is defined as a combination of an NDP announcement, an NDP, a feedback report, a beamforming report poll, and an additional feedback report. In a conventional SU/MU beamforming method, information on STAs related to the SU/MU-MIMO beamforming is provided at a beginning of NDP sounding subsequent to receiving an NDP announcement packet. The STAs not performing a power saving mode and remaining awake to receive the NDP announcement packet is inappropriate for a device in which power saving is vital. An AP needs to provide information to the STAs on the NDP sounding using an RPS IE of a beacon in advance to control the STAs to wake up at the beginning of the NDP sounding.

Figure 11:
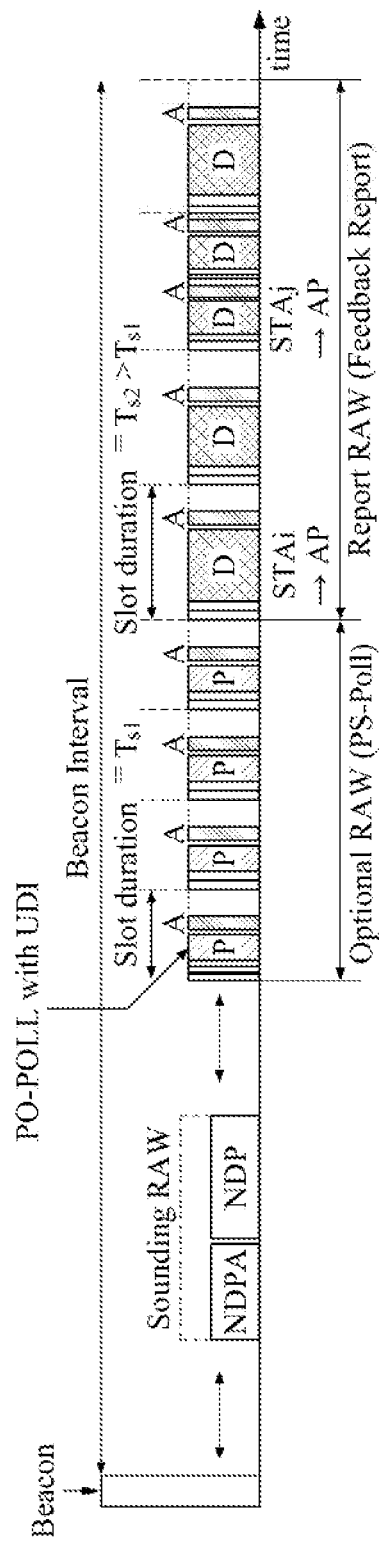
FIG. 11 is a diagram illustrating a method for channel sounding for SU-MIMO beamforming or MU-MIMO beamforming according to an embodiment of the present invention.

FIG. 11 is a diagram illustrating a method for channel sounding for SU-MIMO beamforming or MU-MIMO beamforming according to an embodiment of the present invention.

The method for the channel sounding for SU/MU-MIMO will be described by being divided into two embodiments.

<Method of Performing NDP Sounding for SU/MU-MIMO Beamforming According to One Embodiment>

Referring to FIG. 11, a plurality of channel feedback reports is set to be an additional RAW indicated in an RPS IE of a beacon subsequent to a sounding RAW. Hereinafter, an RAW for transmission of feedback reports is referred to as a report RAW. STAs wake up from a power saving mode at a beginning of a report RAW. An AID range of an STA targeted for channel sounding is indicated in the RPS IE of the beacon. A sequence combination of STAs targeted for channel sounding is indicated in an NDPA provided in a predetermined sequence. An AP optionally allocates an RAW for a PS-Poll prior to the report RAW because the AP does not know an amount of data of a channel feedback report to be transmitted by each of the STAs and a feedback transmission mode for each of the STAs. The PS-Poll describes UDI information indicating a data amount of a buffer for a modulation and coding scheme (MCS) and UL transmission. The AP optionally allocates PS-Poll RAWs allocated to an additional slot for a plurality of STAs prior to the report RAW. Start timing information of the PS-Poll RAW is included in the RPS IE of the beacon. "P" frame denotes a PS-Poll frame, "D" frame denotes an UL data frame transmitted by an STA to an AP, and "A" frame denotes an ACK frame as shown in FIG. 11.

<Method of Performing NDP Sounding for SU/MU-MIMO Beamforming According to Another Embodiment>

In the method of performing the NDP sounding for the SU/MU-MIMO beamforming according to another embodiment, a beamforming RAW is set by extending a scope of a sounding RAW. An entire protocol sequence with respect to various combinations of NDPA transmission, NDP transmission, a beamforming report feedback, a beamforming report poll, and an additional beamforming report feedback is protected by the beamforming RAW. The beamforming RAW is set to be an additional RAW indicated in an RPS IE of a beacon, and classified as a type of a modified version of the sounding RAW. Transmission by an STA aside from transmission of a channel feedback report is prohibited during the beamforming RAW. Identifying a type of the beamforming RAW may be performed through a sounding RAW indication and a sounding RAW type indication included in the RPS IE of the beacon. Descriptions pertaining to the sounding RAW indication and the sounding RAW type indication will be provided later.

STAs wake up from a power saving mode at a beginning of the beamforming RAW. An AID range of an STA targeted for channel sounding is indicated in the RPS IE of the beacon. A sequence combination of STAs targeted for channel sounding is indicated in an NDPA in a predetermined sequence. Alternatively, the STAs wake up from the power saving mode at a slot boundary predetermined with respect to the STAs by additionally setting independent slots respectively for combinations of an NDPA, an NDP, a beamforming report, a beamforming report poll, and an additional beamforming report in the beamforming RAW. Through this, relatively efficient power saving may be possible.

An AP estimates a duration of time in which a channel feedback report is transmitted based on an MCS and a bandwidth pre-set to transmit the channel feedback report, and based on a result of the estimation, sets a length of an entire beamforming RAW to be sufficiently long because the AP does not know an amount of data of the channel feedback report to be transmitted by each of the STAs and a feedback transmission mode for each of the STAs. For example, the AP uses a basic rate of a BSS or an MCS in which an NDPA is transmitted as the transmission MCS for the channel feedback report. The transmission bandwidth for the channel feedback report is determined to correspond to a bandwidth of an NDPA signal or an NDP signal.

Figure 12:
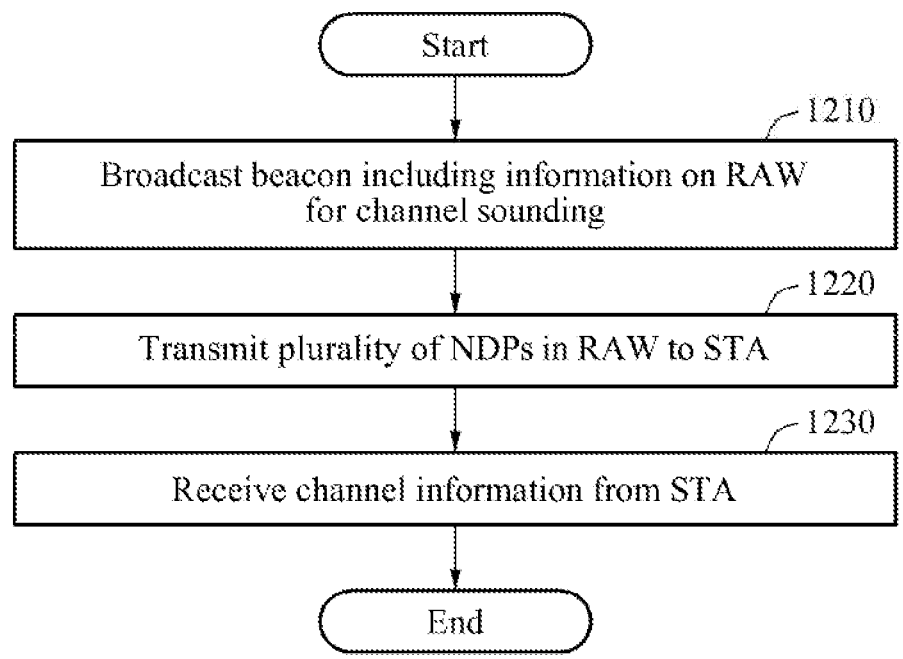
FIG. 12 is a flowchart illustrating an operation of a method for channel sounding performed by an access point (AP) according to an embodiment of the present invention.

FIG. 12 is a flowchart illustrating an operation of a method for channel sounding performed by an AP according to an embodiment of the present invention.

A method for channel sounding for SST and a method for channel sounding for sectorized beam operation may be integrated because an STA operates in the channel sounding for SST and the channel sounding for sectorized beam operation in a similar manner during a sounding RAW. For example, the STA may be prohibited from data transmission to stably perform channel sounding during the sounding RAW. The channel sounding is performed on all STAs or STAs having a restricted range of an AID. The STA targeted for the channel sounding wakes up at a beginning of the sounding RAW, and listens to an entire sounding RAW. The integrated channel sounding method may enable efficient use of spatial resources and frequency resources, and enhance a channel sounding performance.

Alternatively, any transmission by an STA aside from transmission of a report packet to report information on a sector ID or a selected sub-channel subsequent to receiving a series of NDPs is prohibited during the sounding RAW to guarantee the channel sounding performance. The channel sounding is performed on all STAs or STAs having a restricted range of an AID. The STA wakes up at a beginning of the sounding RAW, and listens to the sounding RAW until an end of the sounding RAW or until the transmission of the series of NDPs terminates.

In the channel sounding for SST, the sounding RAW may be provided in a form of sweeping a plurality of frequency channels, or a form in which transmission of a report packet of information on a sub-channel selected subsequently is included. In the channel sounding for sectorized beam operation, the sounding RAW may be provided in a form of sweeping a plurality of sectors, or a form in which transmission of a report packet related to information on a sector ID selected subsequently is included.

In operation 1210, an AP broadcasts a beacon including information on an RAW for channel sounding. The AP controls data transmission by an STA in an RAW duration for channel sounding. In an example, the AP controls the data transmission by the STA to be prohibited in the RAW duration for channel sounding. In another example, the AP controls transmission of estimated channel information to the AP to be allowed, and other transmission to be prohibited in the RAW duration for channel sounding subsequent to transmission of NDPs.

The beacon transmitted by the AP includes at least one of a bit value indicating whether channel sounding is performed through a corresponding RAW, a bit value to control transmission by an STA in a corresponding RAW duration, and a bit value indicating a communication type to be performed by a corresponding AP.

According to an embodiment of the present invention, information provided in Table 1 is included in an RPS IE transmitted by the beacon.

TABLE 1

| Feature | Value | Interpretation |
| --- | --- | --- |
| Page ID | TBD bits | Indicates the page index for hierarchical AID (based on hierarchical AID) of the allocated group |
| Block Offset | TBD bits | Assuming 32 blocks per page, these bits indicate the starting block index of the allocated group |
| Block Range | TBD bits | Indicates the number of blocks (starting from the block offset) for the allocated group |
| RAW Start Time | 8 bits | Duration in TU from end of beacon transmission to RAW Start time |
| RAW Duration | TBD bits | Duration of RAW in TU |
| Access restricted to paged STA only | 2 bits | Bit 1: Set to 1 if only STA with their TIM bit set to 1 are allowed to perform UL transmissions<br>Bit 2: Set to 1 if RAW is reserved for frames with duration smaller than slot duration, such as PS-Polls/trigger frames (ignored if Bit 1 is not set) |
| Group/Resource allocation frame indication | 1 bits | Set to 1 to indicate if STAs need to wake up at the beginning of the RAW to receive group addressed frames such as resource allocation (format of the resource allocation frame TBD) |
| Sounding RAW Indication | 1 bits | Set to 1 to indicate if non-AP STAs are prohibited to transmit but may elect to listen the entire RAW Set to 0 otherwise |
| Sounding RAW Type Indication | TBD bit | Set to 0 to indicate this Sounding RAW in for SST sounding only for SST capable STAs<br>Set to 1 to indicate this Sounding RAW is for sector sounding only for sector capable STAs<br>Set to 2 to indicate this Sounding RAW is for beamforming (SU/MU) only for beamformee capable STAS<br>Others: TBD |
| Slot definition | TBD bits | Include<br>Slot duration signaling<br>Slot assignment to STA<br>Cross boundary transmissions allowed/not allowed<br>Format is TBD |

As described in Table 1, the beacon includes a bit value indicating whether to prohibit transmission by STAs in a sounding RAW. The beacon includes a bit value indicating whether a corresponding sounding RAW is used for the channel sounding for SST, the channel sounding for sectorized beam operation, or the channel sounding for SU/MU MIMO beamforming.

According to another embodiment of the present invention, information provided in Table 1 is included in an RPS IE transmitted by the beacon.

TABLE 2

| Feature | Value | Interpretation |
|---|---|---|
| Page ID | TBD bits | Indicates the page index for hierarchical AID (based on hierarchical AID) of the allocated group |
| Block Offset | TBD bits | Assuming 32 blocks per page, these bits indicate the starting block index of the allocated group |
| Block Range | TBD bits | Indicates the number of blocks (starting from the block offset) for the allocated group |
| RAW Start Time | 8 bits | Duration in TU from end of beacon transmission to RAW Start time |
| RAW Duration | TBD bits | Duration of RAW in TU |
| Access restricted to paged STA only | 2 bits | Bit 1: Set to 1 if only STA with their TIM bit set to 1 are allowed to perform UL transmissions<br>Bit 2: Set to 1 if RAW is reserved for frames with duration smaller than slot duration, such as PS-Polls/trigger frames (ignored if Bit 1 is not set) |
| Group/Resource allocation frame indication | 1 bits | Set to 1 to indicate if STAs need to wake up at the beginning of the RAW to receive group addressed frames such as resource allocation (format of the resource allocation frame TBD) |
| Sounding RAW Indication | 1 bits | Set to 1 to indicate if non-AP STAs are prohibited to transmit except but report packets following a series of NDP but may elect to listen the entire RAW<br>Set to 0 otherwise |
| Sounding RAW Type Indication | TBD bit | Set to 0 to indicate this Sounding RAW in for SST sounding only for SST capable STAs<br>Set to 1 to indicate this Sounding RAW is for sector sounding only for sector capable STAs<br>Others: TBD |
| Slot definition | TBD bits | Include<br>Slot duration signaling<br>Slot assignment to STA<br>Cross boundary transmissions allowed/not allowed<br>Format is TBD |

As described in Table 2, the beacon includes a bit value indicating whether to prohibit other transmissions by STAs aside from transmission of a report packet in a sounding RAW. The beacon includes a bit value indicating whether a corresponding sounding RAW is used for the channel sounding for SST or the channel sounding for sectorized beam operation.

According to still another embodiment of the present invention, information provided in Table 3 is included in an RPS IE transmitted by the beacon.

TABLE 3

| Feature | Value | Interpretation |
|---|---|---|
| Page ID | TBD bits | Indicates the page index for hierarchical AID (based on hierarchical AID) of the allocated group |
| Block Offset | TBD bits | Assuming 32 blocks per page, these bits indicate the starting block index of the allocated group |
| Block Range | TBD bits | Indicates the number of blocks (starting from the block offset) for the allocated group |
| RAW Start Time | 8 bits | Duration in TU from end of beacon transmission to RAW Start time |
| RAW Duration | TBD bits | Duration of RAW in TU |
| Access restricted to | 2 bits | Bit 1: Set to 1 if only STA with their TIM bit set to 1 are allowed to perform UL transmissions |

TABLE 3-continued

| Feature | Value | Interpretation |
|---|---|---|
| paged STA only | | Bit 2: Set to 1 if RAW is reserved for frames with duration smaller than slot duration, such as PS-Polls/trigger frames (ignored if Bit 1 is not set) |
| Group/Resource allocation frame indication | 1 bits | Set to 1 to indicate if STAs need to wake up at the beginning of the RAW to receive group addressed frames such as resource allocation (format of the resource allocation frame TBD) |
| Sounding RAW Indication | 1 bits | Set to 1 to indicate if non-AP STAs are prohibited to transmit but may elect to listen the entire RAW Set to 0 otherwise |
| Sounding RAW Type Indication | TBD bit | Set to 0 to indicate this Sounding RAW in for SST sounding only for SST capable STAs Set to 1 to indicate this Sounding RAW is for sector sounding only for sector capable STAs Others: TBD |
| Beamforming RAW Indication | 1 bits | Set to 1 to indicate this Sounding RAW is for beamforming (SU/MU) only for beamformee capable STAS Set to 0 otherwise |
| Slot definition | TBD bits | Include Slot duration signaling Slot assignment to STA Cross boundary transmissions allowed/not allowed Format is TBD |

As described in Table 3, the beacon includes a bit value indicating whether to prohibit transmission by STAs in a sounding RAW. The beacon includes a bit value indicating whether a corresponding sounding RAW is used for the channel sounding for SST or the channel sounding for sectorized beam operation. In addition, the beacon includes a bit value indicating whether the corresponding sounding RAW is used for the channel sounding for SU/MU MIMO beamforming.

According to further another embodiment of the present invention, a combination of a sounding RAW and a corresponding report RAW is represented in a form of an RAW type and a sub-mode as shown in Table 4.

TABLE 4

| RAW Type | | | RAW Type |
|---|---|---|---|
| Bit 0 | Bit 1 | Description | Options Subfield |
| 0 | 0 | The RAW is a Generic RAW. | Bit 0: Paged STA Bit 1: RA Frame |
| 0 | 1 | The RAW is a Sounding/Report RAW. | 0: SST Sounding RAW 1: Sector Sounding RAW 2: SST Report RAW 3: Sector Report RAW |
| 1 | 0 | The RAW is a Simplex RAW. | 0: AP PM RAW 1: Non-TIM RAW 2: Omni RAW 3: Reserved |
| 1 | 1 | The RAW is a Triggering Frame RAW. | Reserved |

As described in Table 4, when the RAW type is a sounding RAW, a non-AP STA may not newly start a TXOP during an RAW, and select to listen to sector sounding or SST sounding. The Non-AP STA is allowed to transmit a response frame with respect to a frame transmitted by an AP during a receive priority control slot (RXP).

As described in Table 4, when the RAW type is a report RAW, a single or a plurality of report RAWs is scheduled by an AP in response to a preceding sounding RAW. In a corresponding RAW duration, a sector report or an SST report is performed by a single or a plurality of STAs, irrespective of a setting of TIM bits corresponding to each of the STAs.

In the report RAW with respect to the sector sounding, the STA transmits a sector report frame including a preferred sector ID to the AP at a point in time not prior to a beginning of an assigned RAW slot. The AP confirms the aforementioned transmission of the sector report frame by transmitting a response frame, for example, ACK, Block ACK, NDP ACK, or short ACK, subsequent to an interval of an SIFS. In this example, the response frame transmitted by the AP includes information about a duration in which the corresponding STA maintains power saving. A length of a sector report frame exchange sequence may not exceed an assigned slot duration calculated by information provided in an "RAW Slot Definition" subfield of an "RAW Assignment" field of an RPS element.

According to an embodiment of the present invention, an NDP PS Poll frame format is defined by Table 5 or Table 6 as a frame format with respect to sector report frames. Table 5 represents an example of an MAC frame body of an NDP PS Poll. Table 6 represents another example of an MAC frame body of an NDP PS Poll. The NDP PS Poll frame format expressed by Table 5 or Table 6 has a form substituted by a preferred sector ID value or an offset value with respect to a reference sector ID in a "Preferred MCS" field or an "UDI" field. Such a modified NDP PS Poll frame format is only available in the report RAW with respect to the SST sounding or the sector sounding.

TABLE 5

| Field | Size (bits) | Description |
|---|---|---|
| NDP MAC Frame Type | 3 | The NDP MAC Frame Type field is set to 1 |

TABLE 5-continued

| Field | Size (bits) | Description |
| --- | --- | --- |
| RA | 9 | PARTIAL_AID addressed to AP |
| TA | 9 | PARTIAL_AID addressed to a STA |
| Preferred MCS | TBD | TBD |
| UDI | 1 | Se to 0: no uplink data<br>Set to 1: uplink data present |
| Reserved | TBD | |

TABLE 6

| Field | Size (bits) | Description |
| --- | --- | --- |
| NDP MAC Frame Type | 3 | The NDP MAC Frame Type field is set to 1 |
| RA | 9 | PARTIAL_AID addressed to AP |
| TA | 9 | PARTIAL_AID addressed to a STA |
| Preferred MCS | 4 | Preferred MCS field indicates the preferred MCS level of the STA for downlink transmission, and its value represents MCS index. This field may be used in determining MCS level of PPDU for BU delivery. |
| UDI | 12 | Set to 0: No uplink data<br>Set to Non-zero: Duration of uplink data in unit of TU. |

In the report RAW with respect to the SST sounding, the STA transmits an SST report frame including a preferred sub-channel index in a form of a bitmap or coding to the AP at a point in time not prior to a beginning of an assigned RAW slot. The AP confirms the aforementioned transmission of the SST report frame by transmitting a response frame, for example, ACK, Block ACK, NDP ACK, or short ACK, subsequent to an interval of an SIFS. In this example, the response frame transmitted by the AP includes information about a duration in which the corresponding STA maintains power saving. A length of an SST report frame exchange sequence may not exceed an assigned slot duration calculated by information provided in an "RAW Slot Definition" subfield of an "RAW Assignment" field of an RPS element.

According to another embodiment of the present invention, an NDP PS Poll frame format is defined by Table 5 or Table 6 as a frame format with respect to SST report frames. Table 5 represents an example of an MAC frame body of an NDP PS Poll. Table 6 represents another example of an MAC frame body of an NDP PS Poll. The NDP PS Poll frame format expressed by Table 5 or Table 6 has a form substituted by a preferred channel index value or an offset value from a reference channel in a "Preferred MCS" field or an "UDI" field. Such a modified NDP PS Poll frame format is only available in the report RAW with respect to the sector sounding or the SST sounding.

When the AP performs channel sounding, the AP schedules the channel sounding with respect to a plurality of STAs using an RAW of a beacon signal. In this example, the AP sets a sounding RAW indication bit in an RPS IE to "1", and sets a sounding RAW type indication to correspond to a type of the channel sounding to be performed. For example, the sounding RAW type indication indicates whether a corresponding sounding RAW is for channel sounding for SST or channel sounding for sectorized beam operation. A sounding RAW indication bit in an RPS IE of a beacon being set to "0" indicates that the channel sounding is not performed in a corresponding RAW. The sounding RAW may be transmitted based on a periodic method or an arbitrary method.

In operation 1220, the AP transmits a plurality of NDPs in an RAW for channel sounding. The AP successively transmits the plurality of NDPs at predetermined time intervals. For example, the AP transmits the NPDs at time intervals of an SIFS or a PIFS. The STA wakes up at a beginning of the RAW for channel sounding, and remains awake until an end of the corresponding RAW or the transmission of the series of the NDPs terminates.

When the AP performs channel sounding for SST, hereinafter also referred to as "SST sounding", the AP transmits an NDPA in a sounding RAW, and successively transmits a series of NDPs at intervals of a PIFS. In this example, the AP sets a sounding RAW type indication in the RPS IE to correspond to the SST sounding. The AP transmits the plurality of NDPs via differing frequency channels, respectively. In this example, a basic unit of indicating an available frequency channel or a frequency channel for transmission may change, and a bit field indicating an option with respect to a basic unit setting may be defined. The available frequency channel or the frequency channel for transmission with respect to an entire frequency band based on a corresponding basic unit may be represented in a form of a bitmap or coding. The AP transmits the NDPs for a plurality of frequency channels used for SST in the RAW for the channel sounding. For example, the AP transmits a series of NDPs starting from a frequency channel of a relatively low band at intervals of a PIFS.

When the AP performs channel sounding for sectorized beam operation, hereinafter also referred to as "sector sounding", the AP transmits an NDPA in a sounding RAW, and successively transmits a series of NDPs at intervals of a PIFS. In this example, the AP sets a sounding RAW type indication in an RPE IE to correspond to sector sounding. The AP transmits the NDPs through differing sectors, respectively. The AP transmits the NDPs for the plurality of sectors, respectively, set by the AP in an RAW duration for channel sounding. For example, the AP transmits a series of NDPs from a sector number "0" at time intervals of a PIFS.

The AP receives channel information estimated based on an NDP from the STA, and performs wireless communication with the ST based on the received channel information. The AP receives the channel information through an RAW for a feedback report. The RAW for the feedback report is allocated subsequent to the RAW for channel sounding. In an instance of the channel sounding for SST, the AP receives optimum frequency channel information determined by the STA as channel information. In an instance of the channel sounding for sectorized beam operation, the AP receives optimum sector ID information determined by the STA as channel information.

Figure 13:
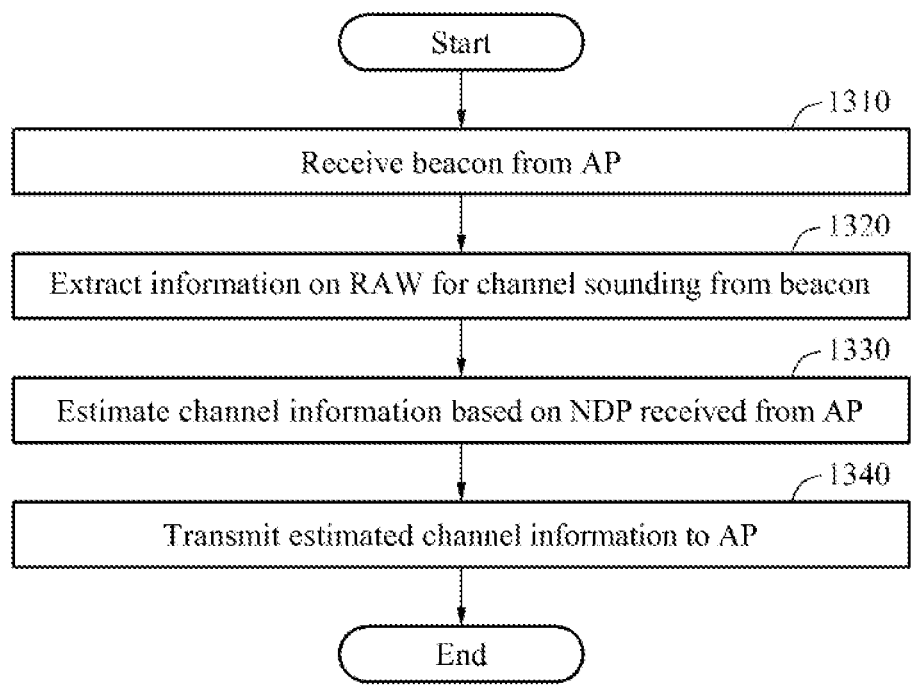
FIG. 13 is a flowchart illustrating an operation of a method for channel sounding performed by a station (STA) according to an embodiment of the present invention.

FIG. 13 is a flowchart illustrating an operation of a method for channel sounding performed by an STA according to an embodiment of the present invention.

In operation 1310, the STA receives a beacon including information on an RAW, for example, a sounding RAW, for channel sounding from an AP. The STA identifies a type of channel sounding through the beacon. For example, the STA determines whether the type of channel sounding is SST sounding or sector sounding based on sounding RAW type information included in an RPS IE of the beacon.

In operation 1320, the STA estimates channel information based on an NDP received from the AP. The NDP is transmitted in the RAW for channel sounding. For example, the channel information includes information on an optimum frequency channel for SST or on an optimum sector ID for sectorized beam operation. The STA is prohibited from data transmission in an RAW duration for channel sounding. Alternatively, the STA is allowed to transmit the channel information to the AP subsequent to the transmission of the NDPs, and prohibited from other transmission in the RAW duration for channel sounding. The STA identifies a communication type to be performed by the AP based on the beacon received from the AP, and determines whether the identified communication type is supported. When the identified communication type is supported, the STA receives an NDP from the AP in the RAW for channel sounding, and estimates the channel information based on the received NDP or the identified communication type. For example, the communication type is one of SST, sectorized beam operation, SU-MIMO beamforming, and MU-MIMO beamforming.

According to an embodiment of the present invention, when the sounding RAW type is set to the SST sounding, the STA is prohibited from data transmission during a sounding RAW. When the corresponding STA supports an SST function, listening to an entire sounding RAW is allowed. The STA determines an optimum frequency channel based on an NDP. The STA searches for a frequency channel that satisfies a predetermined criterion from among frequency channels used for communication with the AP, and determines information on the found frequency channel to be channel information. In operation 1330, the STA transmits the estimated channel information to the AP. In one example, the STA reports the determined optimum frequency channel directly to the AP. In another example, the STA reports information on the optimum frequency channel indirectly to the AP by transmitting data using the determined optimum frequency channel. As such, the STA determines the frequency channel that satisfies the predetermined criterion from among the plurality of frequency channels based on the NDP, and transmits the channel information to the AP using the determined frequency channel. Alternatively, the STA is prohibited from other transmissions aside from the reporting of the optimum frequency channel subsequent to receiving a series of NDPs during the sounding RAW. When the corresponding STA supports the SST function, or the transmission of the series of NDPs terminates listening to the entire sounding RAW is allowed. The STA transmits the determined optimum frequency channel information to the AP through a report packet. When each of multiple STAs sends a feedback on the optimum frequency channel to the AP, the AP controls frames for the feedback on the optimum frequency channel to be transmitted though the report RAW to avoid a collision between the frames for the feedback on the optimum frequency channel and other signals. In this example, a beginning of the report RAW and a series of information are included in the RPS IE of the beacon transmitted by the AP. When the estimated channel information is transmitted to the AP, transmission by other STAs aside from an STA that transmits the channel information is prohibited.

According to another embodiment of the present invention, when the sounding RAW type is set to the sector sounding, the STA is prohibited from data transmission during a sounding RAW, and when the corresponding STA supports a sectorized beam operation function, listening to an entire sounding RAW is allowed. Alternatively, the STA is prohibited from other transmission aside from reporting an optimum sector ID subsequent to receiving a series of NDPs during the sounding RAW. When the corresponding STA supports the sectorized beam operation function, or until the transmission of the series of NDPs terminates, listening to the entire sounding RAW is allowed. The STA searches for a sector to which the STA belongs from among a plurality of sectors set by the AP, and determines identification information of the found sector to be channel information. In operation 1330, the STA transmits the estimated channel information to the AP. The STA optionally sends feedback on the determined optimum sector ID to the AP subsequent to sector sounding. The STA transmits the determined optimum sector ID to the AP through a report packet. When each of multiple STAs sends feedback on the optimum sector ID to the AP, the AP controls frames for the feedback on the sector ID to be transmitted though the report RAW to avoid a collision between the frames for the feedback on the sector ID and other signals. In this example, a beginning of the report RAW and a series of information are included in the RPS IE of the beacon transmitted by the AP. When the estimated channel information is transmitted to the AP, transmission by other STAs aside from an STA that transmits the channel information is prohibited.

Figure 14:
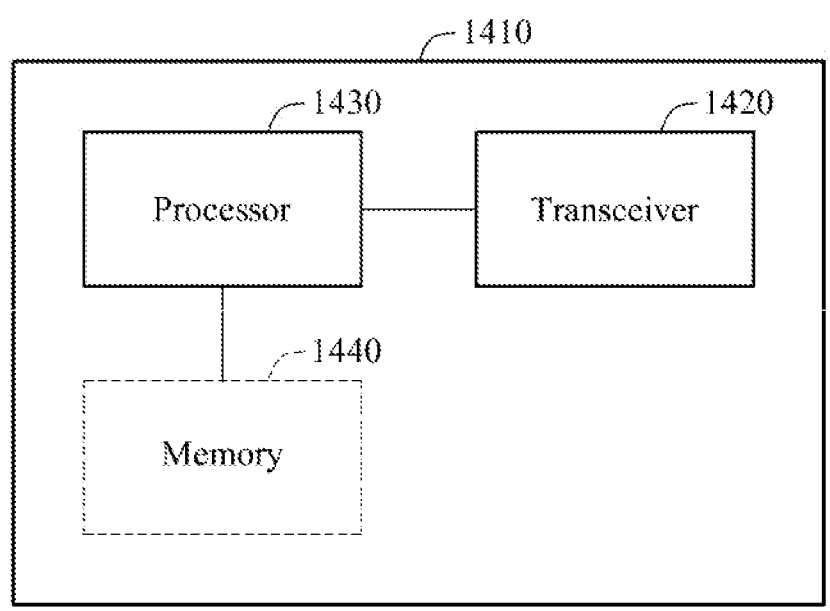
FIG. 14 is a diagram illustrating a configuration of a wireless apparatus according to an embodiment of the present invention.

FIG. 14 is a diagram illustrating a configuration of a wireless apparatus 1410 according to an embodiment of the present invention.

Referring to FIG. 14, the wireless apparatus 1410 includes a processor 1430, a memory 1440, and a transceiver 1420. The wireless apparatus 1410 corresponds to an AP or an STA of the present invention.

The transceiver 1420 transmits or receives a wireless signal. The processor 1430 is set to operate by being functionally connected to the transceiver 1420. The processor 1430 controls the wireless apparatus 1410 to perform the channel sounding method described with reference to FIGS. 7, 9, and 11 through 13.

At least one of the processor 1430 and the transceiver 1420 includes at least one of an application-specific integrated circuit (ASIC), a logic circuit, and a data processing apparatus. When embodiments are implemented in software, the aforementioned method may be implemented in a module, a process, or a function that performs the functions described in the foregoing. The module is stored in the memory 1440, and performed by the processor 1430. The memory 1440 may be included inside the processor 1430, and functionally connected to the processor 1430 by being additionally disposed external to the processor 1430 in various known manners.

In the exemplary system, the above-mentioned methods are described based on the flowchart by a series of steps or blocks, but the present invention is not limited to the order of the steps, and some steps may occur in a different order or simultaneously with other steps. Also, those skilled in the art will be able to understand that the different stages or steps shown in the flowchart are not exclusive but can be further added, or one or more steps of the flowchart may be deleted without affecting the scope of the present invention.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The computer readable recording medium may include any data storage device that can store data which can be thereafter read by a computer system or processing device. Examples of the computer readable recording medium include read-only memory (ROM), random-access memory (RAM), CD-ROMs, magnetic tapes, floppy disks, optical data storage devices. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents.

Accordingly, other implementations are within the scope of the following claims.

The invention claimed is:

1. A method for channel sounding in a wireless local area network (WLAN) system performed by an access point (AP), the method comprising:
broadcasting a beacon comprising information on a sub-channel selective transmission (SST) sounding restricted access window (RAW) for channel sounding; and
transmitting a plurality of null data packet (NDP) frames to a station (STA) through a plurality of channels in the SST sounding RAW, wherein each of the plurality of NDP frames indicates a channel allocated to each of the plurality of NDP frames,
wherein a sub-channel is selected by the STA based on information included in the plurality of NDP frames,
wherein the plurality of NDP frames are successively transmitted at predetermined time intervals of a short inter-frame space (SIFS), and
wherein the SST sounding RAW is allocated to the STA only for the channel sounding.

2. The method of claim 1, wherein the AP controls the data transmission by the STA to be prohibited over the SST sounding RAW for the channel sounding.

3. The method of claim 2, wherein the AP controls transmission of channel information to the AP to be allowed, and other transmission to be prohibited, subsequent to the transmission of the NDP frames in the SST sounding RAW for the channel sounding.

4. The method of claim 1, wherein the beacon comprises at least one of:
a bit value indicating whether the channel sounding is performed through the SST sounding RAW, a bit value to control the transmission by the STA in a duration of the SST sounding RAW, and a bit value indicating a communication type to be performed by the AP.

5. The method of claim 1, wherein the transmitting comprises:
transmitting the NDP frames for a plurality of sectors set by the AP in the SST sounding RAW for the channel sounding.

6. The method of claim 1, wherein the method further comprising:
receiving, from the STA, a report frame including information on at least one channel selected by the STA based on the NDP frames.

7. The method of claim 6, wherein the receiving comprises:
receiving the report frame through an additional RAW for a feedback report,
wherein the additional RAW for the feedback report is allocated subsequent to the SST sounding RAW for the channel sounding.

8. The method of claim 1,
wherein channel information is estimated based on the NDP frames.

9. The method of claim 1, wherein the transmitting comprises:
transmitting the NDP frames at predetermined time intervals of a point inter-frame space (PIFS).

10. The method of claim 1, wherein the plurality of NDP frames are successively transmitted after a sounding announcement frame is transmitted to the STA to indicate the STA to receive the NDP frames.

11. A method for channel sounding in a wireless local area network (WLAN) system performed by a station (STA), the method comprising:
receiving, from an access point (AP), a beacon comprising information on a sub-channel selective transmission (SST) sounding restricted access window (RAW) for channel sounding;
receiving, from the AP, a plurality of null data packets (NDP) frames through a plurality of channels in the SST sounding RAW for the channel sounding, wherein each of the plurality of NDP frames indicates a channel allocated to each of the plurality of NDP frames;
estimating channel information based on the plurality of NDP frames received from the AP; and
selecting a sub-channel based on information included in the plurality of NDP frames,
wherein the plurality of NDP frames are successively transmitted at predetermined time intervals of a short inter-frame space (SIFS), and
wherein the plurality of NDP frames are transmitted to the STA in the SST sounding RAW.

12. A wireless apparatus comprising:
a transceiver to transmit and receive a frame; and
a processor functionally associated with the transceiver,
wherein the processor broadcasts a beacon comprising information on a sub-channel selective transmission (SST) sounding restricted access window (RAW) for channel sounding, and
transmits a plurality of null data packet (NDP) frames to a station (STA) through a plurality of channels in the SST sounding RAW, wherein each of the plurality of NDP frames indicates a channel allocated to each of the plurality of NDP frames,
wherein a sub-channel is selected by the STA based on information included in the plurality of NDP frames,
wherein the plurality of NDP frames are successively transmitted at predetermined time intervals of a short inter-frame space (SIFS), and
wherein the SST sounding RAW is allocated to the STA only for the channel sounding.

13. A wireless apparatus comprising:
a transceiver to transmit and receive a frame; and
a processor functionally associated with the transceiver,
wherein the processor receives, from an access point (AP), a beacon comprising information on a sub-channel selective transmission (SST) sounding restricted access window (RAW) for channel sounding, receives, from the AP, a plurality of null data packet (NDP) frames through a plurality of channels in the SST sounding RAW for the channel sounding, wherein each of the plurality of NDP frames indicates a channel allocated to each of the plurality of NDP frames, estimates channel information based on the plurality of NDP frames received from the AP, and selects a sub-channel based on information included in the plurality of NDP frames, wherein the plurality of NDP frames are successively transmitted at predetermined time intervals of a short inter-frame space (SIFS), and wherein the plurality of NDP frames are transmitted to the STA in the SST sounding RAW.

* * * * *